United States Patent
Case et al.

(10) Patent No.: US 8,464,069 B2
(45) Date of Patent: Jun. 11, 2013

(54) SECURE DATA ACCESS METHODS AND APPARATUS

(75) Inventors: Lawrence L. Case, Phoenix, AZ (US); Thomas Tkacik, Phoenix, AZ (US)

(73) Assignee: Freescale Semiconductors, Inc., Austin, TX (US)

( * ) Notice: Subject to any disclaimer, the term of this patent is extended or adjusted under 35 U.S.C. 154(b) by 1429 days.

(21) Appl. No.: 11/671,271

(22) Filed: Feb. 5, 2007

(65) Prior Publication Data

US 2008/0189560 A1 Aug. 7, 2008

(51) Int. Cl.
*H04L 9/14* (2006.01)

(52) U.S. Cl.
USPC ............. 713/189; 713/193; 713/194; 726/26; 726/30

(58) Field of Classification Search
None
See application file for complete search history.

(56) References Cited

U.S. PATENT DOCUMENTS

| | | | |
|---|---|---|---|
| 5,485,577 A | 1/1996 | Eyer et al. | |
| 6,577,734 B1 | 6/2003 | Etzel et al. | |
| 6,609,199 B1 | 8/2003 | DeTreville | |
| 7,103,782 B1 | 9/2006 | Tugenberg et al. | |
| 2002/0091826 A1* | 7/2002 | Comeau et al. | 709/226 |
| 2003/0133576 A1* | 7/2003 | Grumiaux | 380/279 |
| 2004/0177266 A1 | 9/2004 | Moyer et al. | |
| 2005/0138403 A1* | 6/2005 | Volp et al. | 713/193 |
| 2006/0026419 A1* | 2/2006 | Arndt et al. | 713/150 |
| 2007/0157030 A1* | 7/2007 | Feghali et al. | 713/189 |

* cited by examiner

*Primary Examiner* — Ashok Patel
*Assistant Examiner* — Alexander Lagor
(74) *Attorney, Agent, or Firm* — Sherry W. Schumm

(57) ABSTRACT

Embodiments include systems and methods for securely accessing data in the context of a data transaction. A system may include a memory block, within which a memory partition may be allocated to the data transaction. The memory partition includes a data storage block and at least one binding register. The system also includes platform entities and an access control block, which determines whether a particular platform entity may access data within the data storage block, and whether a particular platform entity may write binding information into a binding register. Access also may be granted or denied based on the current state of a state machine associated with the data transaction. The system also includes a cipher/binding function adapted to encrypt the data, using the binding information, for storage on an unsecured memory device, and to decrypting encrypted data, using the binding information, which is retrieved from the unsecured memory device.

21 Claims, 6 Drawing Sheets

SECURE DATA ACCESS METHODS AND APPARATUS

TECHNICAL FIELD

Embodiments of the inventive subject matter relate to secure data access methods and apparatus.

BACKGROUND

In a multi-processor platform, such as a system-on-a-chip (SOC), multiple platform entities may access a shared hardware peripheral (e.g., a peripheral memory device). A "platform entity" may include one or more hardware blocks adapted to perform one or more functions. A platform entity may include, for example, a general purpose processor, a microcontroller, a digital signal processor (DSP), a memory controller, direct memory access (DMA) hardware, a cryptographic accelerator, a video, audio, and/or graphics processor, an Ethernet controller, or any of a number of other types of hardware blocks. A platform entity that initiates a transaction may be considered a bus master.

Managing system resources and peripheral access can be complicated, and often this management is performed by one or two privileged entities, such as a memory controller. When an entity requests access (e.g., read or write access) to a peripheral, a memory controller may allocate resources on the chip for the data transfer (e.g., a partition of on-chip random access memory (RAM)). Additionally, the memory controller may set permissions for accessing that resource.

In some cases, an entity may request access to sensitive data. For example, a cryptographic accelerator entity may request access to a secret encryption key. In such cases, it may be desired that only entities within a "trusted" domain have access to the sensitive data, where a "domain" includes a subset of the group of platform entities included within a system, which may have the same access privileges. An entity within a trusted domain may be designed to carefully control use of the sensitive data, and to avoid allowing entities within non-trusted domains from gaining access to the data. Although the cryptographic accelerator may be within the trusted domain, the memory controller that allocated the chip resources typically falls within a non-trusted domain.

During the access transaction, the memory controller may continue to have access to the allocated chip resources, using current system designs. Because the memory controller maintains access to the chip resources, and thus access to the sensitive data, a possibility exists that the memory controller may compromise the sensitive data during the access transaction. Accordingly, a need exists to provide entity domain separation, so that entities within a non-trusted domain are excluded from accessing chip resources allocated to data transfers for entities within a trusted domain.

In addition, there are times when a system is more likely to be secured than others. For example, during booting of a chip, the code execution environment may be very secure, because code is executed out of read-only memory (ROM). After booting, code may be executed from RAM, which is writeable and therefore more prone to being corrupted. Similarly, in a device manufacturing facility, a software image for a product can be written by provisioning software to establish hardware-specific encryption keys. After the device is sold, a device owner may be able to access the encryption keys for some use other than what was originally intended. Accordingly, an additional need exists for methods and apparatus with which data storage initially may be performed with less-restrictive permissions (e.g., in a secure environment such as a manufacturing facility), where the data later becomes accessible with more restrictive permissions (e.g., in a less secure environment outside the manufacturing facility).

DETAILED DESCRIPTION

Embodiments of the inventive subject matter include methods and apparatus for permitting and enabling entities of an electronic system to securely access data. Embodiments of the inventive subject matter also include methods and apparatus for establishing and modifying access privileges for entities within an electronic system. The electronic system includes a system-on-a-chip (SOC), in an embodiment. The term "SOC," as used herein, refers to an electronic system with multiple components combined onto a single integrated circuit ("chip"). The multiple components may include, for example, various digital, analog, mixed-signal, and/or radio frequency (RF) components, as will be described in more detail later. In another embodiment, the electronic system is included within a system-in-package (SIP), which refers to an electronic system with multiple components distributed on multiple chips, where the multiple chips are packaged together within a single package. In still other embodiments, the electronic system with multiple components distributed on multiple chips, where the multiple chips are packaged within multiple packages and interconnected through a printed circuit board or other interconnection apparatus. Although the term "SOC" may be used herein, it is to be understood that the scope of the inventive subject matter is intended to be extrapolated to SIP and multiple-package electronic systems, in various embodiments.

Figure 1:
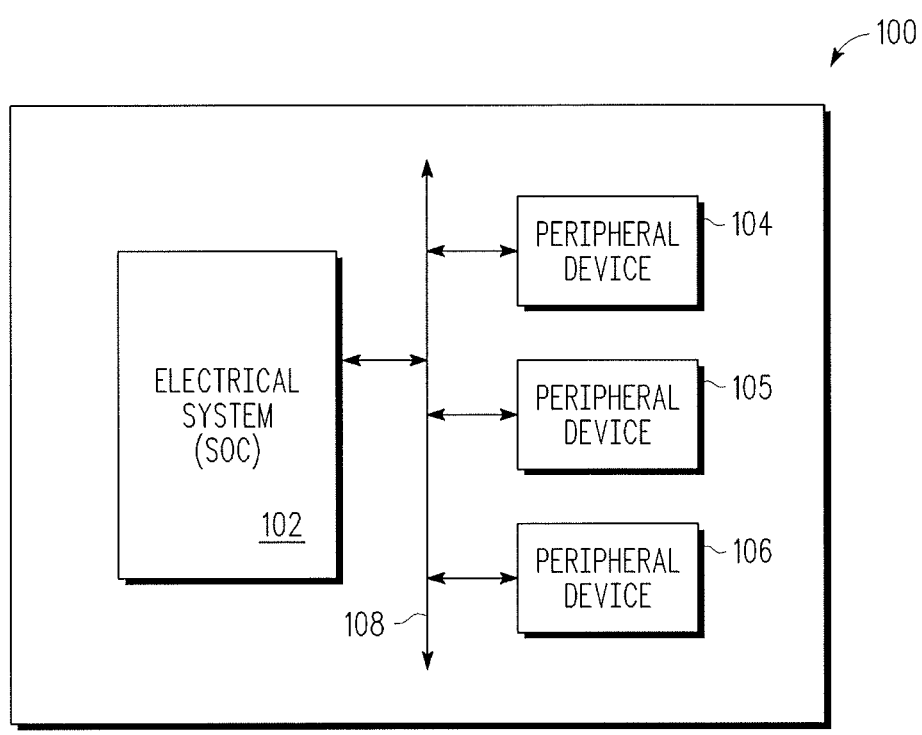
FIG. 1 illustrates a simplified block diagram of an electronic system, in accordance with an example embodiment.

FIG. 1 illustrates a simplified block diagram of a system 100, in accordance with an example embodiment of the inventive subject matter. System 100 may form a portion of a portable or non-portable apparatus or device selected from a group of apparatus that includes a cellular telephone, a pager, a radio, a personal data assistant (PDA), a portable media player (e.g., music, video), a computer, a control module (e.g., for a vehicle, assembly line, etc.), a set top box, or a gaming system, for example, but not by way of limitation.

System 100 includes at least one electronic system 102, at least one peripheral device 104, 105, 106, and a peripheral bus 108, in an embodiment. In an embodiment, electronic system 102 includes an SOC. In other embodiments, electronic system 102 may include an SIP or a multiple-package electronic system. Electronic system 102 may include one or more hardware components and circuitry, which enable electronic system 102 to execute various types of applications. For example, electronic system 102 may execute one or more applications such as data encryption, data decryption, audio processing, video processing, communications functions, and data processing, to name a few. Various apparatus and methods pertaining to electronic system 102, in accordance with embodiments of the inventive subject matter, will be discussed in detail later in conjunction with FIGS. 2-6.

A peripheral device 104-106 may include, for example, a volatile or non-volatile memory component or system (e.g., RAM, ROM, electronically-erasable-programmable ROM (EEPROM) or Flash), a processor (e.g., a microcontroller, microprocessor or digital signal processor (DSP)), an application specific integrated circuit (ASIC), a direct memory access (DMA) unit, an external interface (e.g., a wired or wireless network interface), a user interface (e.g., speaker, display, video screen, keypad, keyboard or pointing device), and/or any of a number of other types of peripheral devices.

Electronic system 102 may execute various types of software applications. A software application may invoke electronic system 102 to exchange data with the at least one peripheral device 104-106 over peripheral bus 108. In particular, an application may invoke electronic system 102 to retrieve data from and/or store data to a peripheral memory device, such as a non-volatile RAM, for example. In other embodiments, data may be retrieved from or stored to a memory device that is external to electronic system 102. As used herein, the term "unsecured memory device" includes a peripheral memory device and/or an external memory device. As will be described in detail later, electronic system 102 is adapted to allocate system resources to a data transaction, and then to ensure that the data is accessible only to entities within an appropriate trusted domain. Further, in various embodiments, electronic system 102 is adapted to alter data access privileges from being less-restrictive to more-restrictive after initial data access.

In addition, in various embodiments, electronic system 102 is adapted to bind and encrypt data for storage on a peripheral memory device (e.g., one of peripheral devices 104-106), in a manner that decreases the likelihood that "non-trusted" entities may later decrypt and access the data. To accomplish this, electronic system 102 may encrypt data using binding information provided by one or more platform entities (e.g., core or platform entities 204-208, FIG. 2) of the electronic system 102, and the resulting encrypted data may be stored on a peripheral memory device, in an embodiment. In addition, electronic system 102 later may retrieve the encrypted data from a peripheral memory device, and decrypt the data using the same binding information that was used to encrypt the data, in an embodiment. These and other functions will be described in detail later.

Figure 2:
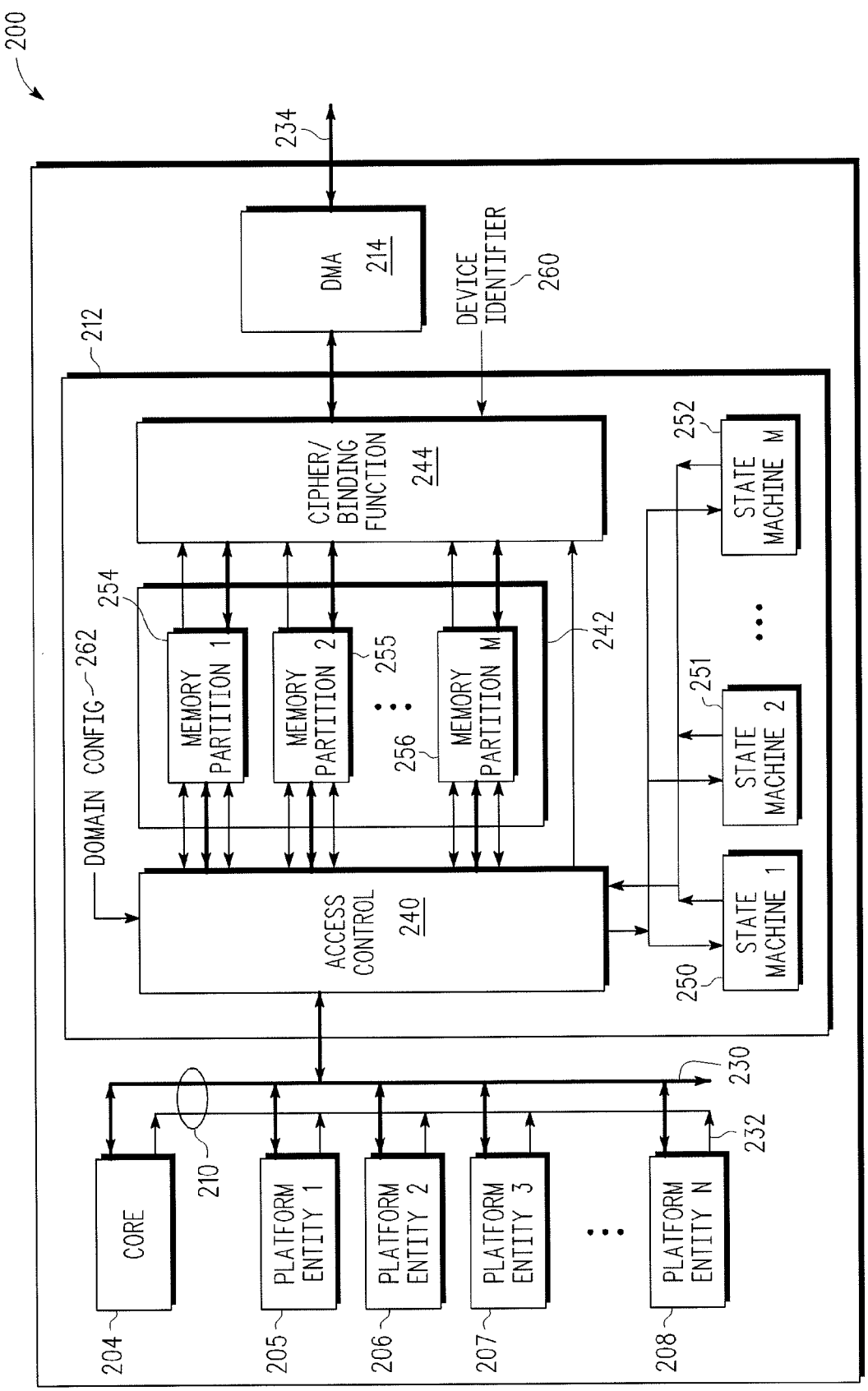
FIG. 2 illustrates a system-on-a-chip component, in accordance with an example embodiment.

FIG. 2 illustrates a simplified block diagram of an electronic system 200 (e.g., an SOC, SIP or multiple-package electronic system), in accordance with an example embodiment. Electronic system 200 includes a core 204, at least one hardware platform entity 205, 206, 207, 208, at least one internal bus 210, at least one memory hardware module 212, and at least one direct memory access (DMA) 214 module, in an embodiment. In another embodiment, one or more of core 204 or platform entities 205-208 may function as a DMA, and DMA 214 may be excluded from system 200. Although four platform entities 205-208, one internal bus 210, one memory hardware module 212, and one DMA 214 are illustrated, electronic system 202 may include more than one core 204, internal bus 210, memory hardware module 212, and/or DMA 214. In addition or alternatively, electronic system 200 may include more or fewer platform entities 205-208, in various embodiments. Further, electronic system 200 may include other electronics or modules, including but not limited to various memory blocks (e.g., RAM, ROM, EEPROM, and/or Flash), timing sources, peripherals, other external interfaces, analog interfaces, voltage regulators, and/or power management circuits, to name a few.

Core 204 may include, for example, a general purpose processor (e.g., a microprocessor), microcontroller or digital signal processor (DSP), in various embodiments. Core 204 is adapted to execute an operating system, in an embodiment, and generally to control operation of electronic system 200. Core 204 may interact with memory hardware module 212 in a similar manner to platform entities 205-208, and accordingly the term "platform entity" is intended to include core 204. Accordingly, in the description, platform entities 205-208 and core 204 may be referred to together as platform entities 204-208.

Core 204 and platform entities 205-208 communicate with memory hardware module 212 over internal bus 210. Internal bus 210 may include, for example, a proprietary or industry-standard bus (e.g., an advanced microcontroller bus architecture (AMBA) bus), which may include data lines 230 and address/control lines 232, in various embodiments. DMA 214 may communicate with one or more peripheral memory devices (e.g., one or more of peripheral devices 104-106, FIG. 1) over peripheral bus 234.

A platform entity 204-208 may include one or more hardware blocks adapted to perform one or more functions (e.g., to execute a software application that performs one or more functions). A platform entity 204-208 may include, for example but not by way of limitation, a general purpose processor, a microcontroller, a DSP, a memory controller, a DMA, a cryptographic accelerator, a video, audio, and/or graphics processor, an Ethernet controller, or any of a number of other types of hardware blocks. A platform entity that initiates a transaction may be considered a bus master. In some cases, a hardware block may include multiple platform entities. For example, a dual-core processor may include two platform entities, and a hardware peripheral that acts on behalf of a number of host processors may be considered a corresponding number of platform entities. In an embodiment, electronic system 200 includes N+1 platform entities 204-208, where N may be any positive integer number. Each platform entity 204-208 is assigned a unique Bus identifier (Bus ID), in an embodiment. In an embodiment, a Bus ID includes a fixed bit pattern. For each platform entity 204-208, a Bus ID may include a value that uniquely identifies the platform entity from other platform entities. In addition, in various embodiments, a Bus ID optionally may include additional bus transaction information, including but not limited to processor state information (e.g., user/supervisor), a security state indicator, a processor number (e.g., for a multiple-core processor), and/or other information.

A "domain" includes a subset of the group of platform entities 204-208 included within system 200. In an embodiment, platform entities 204-208 within a particular domain may have the same access privileges. For example, but not by way of limitation, each of platform entities 204-208 may be configured to be part of a trusted domain or a non-trusted domain. When a platform entity 204-208 is configured to be part of a trusted domain, it is considered to be a "trusted platform entity." When a platform entity 204-208 is not configured to be part of a trusted domain, it is considered to be a "non-trusted platform entity."

Generally, it may be appropriate to configure a platform entity as a trusted platform entity, when the platform entity only executes software that is known to carry a low risk of compromising data. For example, a trusted platform entity may be an entity that only executes software that is loaded at the factory, and that software follows strict rules regarding the use, transfer, and disposition of data. For example, a cryptographic accelerator platform entity that only executes factory-loaded encryption software may be configured as a trusted platform entity.

On the other hand, it may be appropriate to configure a platform entity as a non-trusted platform entity, when the platform entity downloads and executes software that is provided by an external source (e.g., application software), and/or when a significant possibility exists that the platform entity may provide data to other non-trusted platform entities or external sources. For example, a memory controller, general-purpose processor or general DMA may be configured as non-trusted platform entities, because they may execute software and/or exchange data with other system components at the request of those system components or other devices.

In an embodiment, memory hardware module 212 is adapted to facilitate data transactions by securely storing data produced by platform entities 204-208 to peripheral memory devices (e.g., peripheral devices 104-106, FIG. 1), and/or by securely retrieving data from peripheral memory devices for use by platform entities 204-208. Memory hardware module 212 exchanges data with platform entities 204-208 via data lines 230 of internal bus 210, and memory hardware module 212 exchanges data with peripheral memory devices via DMA 214. As used herein, the terms "data transaction" and "transaction" refer to various processes associated with setting up, executing, and terminating an exchange of data between a platform entity 204-208 and a peripheral memory device (e.g., peripheral devices 104-106, FIG. 1) via memory hardware module 212 and DMA 214. A platform entity 204-208 that accesses data in the context of a data transaction is referred to herein as a "Memory User."

In an embodiment, memory hardware module 212 includes access control block 240, memory block 242, and cipher binding function 244. Data involved in a data transaction is stored in memory block 242, which may include volatile RAM, for example. At any given time, one or more memory partitions 254, 255, 256 may be allocated within memory block 242, where each memory partition is used to store data associated with a particular data transaction. In an embodiment, each memory partition 254-256 has a set of binding registers associated with it. "Binding information" provided within a set of binding registers is used during the process of encrypting or decrypting data during storage to or retrieval from a peripheral memory device (e.g., peripheral devices 104-106, FIG. 1) or another remote storage device. As used herein, the term "binding information" means information that is provided by and/or that at least partially identifies a set of platform entities that are permitted to participate in the data transaction in some way. Participation in a data transaction may include, for example, any one or more functions described later in conjunction with Table 1.

Figure 3:
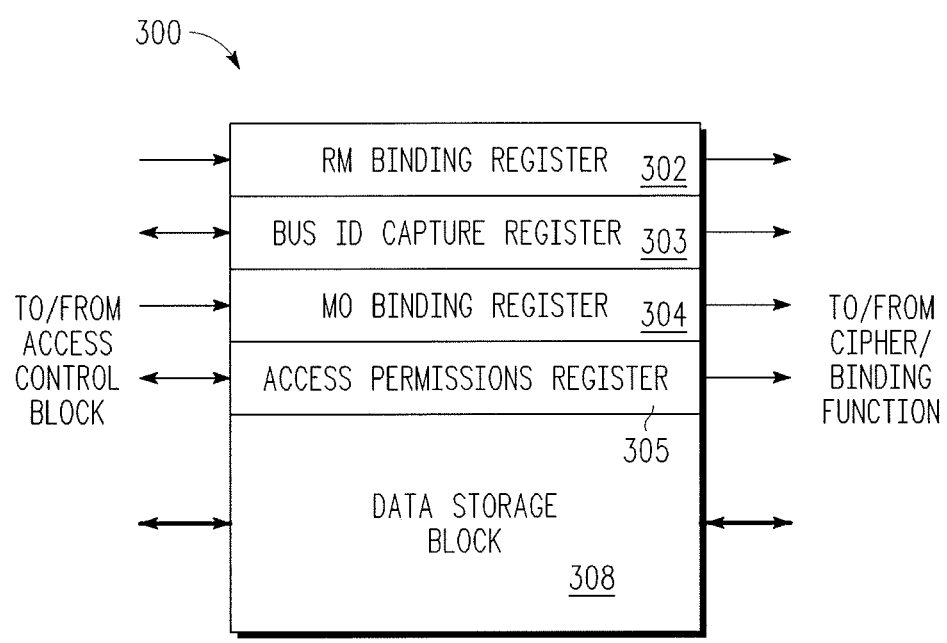
FIG. 3 illustrates a memory partition, in accordance with an example embodiment.

FIG. 3 illustrates a memory partition 300, in accordance with an example embodiment. Memory partition 300 includes a data storage block 308. In addition, in an embodiment, one or more binding registers 302, 303, 304, 305 are associated with memory partition 300. In an embodiment, the binding registers 302-305 include a Resource Manager (RM) binding register 302, a Bus ID capture register 303, a Memory Owner (MO) binding register 304, and an access permissions register 305. In other embodiments, more, fewer or different types of binding registers may be included within a set of binding registers. In addition, in an embodiment, various binding registers may be combined into a single register, or information within a particular register may be divided into multiple registers. As used herein, the term "register" means an addressable storage location, and the term should not be construed as being limited to a particular type of storage location and/or a storage location that is associated with a particular type of hardware.

During a data transaction, various platform entities (e.g., platform entities 204-208, FIG. 2) may attempt to provide binding information by writing to RM binding register 302, MO binding register 304, and access permissions register 305. For example, RM binding register 302 may be written by a platform entity (e.g., platform entity 204-208, FIG. 2) acting as a Resource Manager, and MO binding register 304 may be written by a platform entity acting as a Memory Owner. As will be discussed in more detail later, a Resource Manager may allocate memory, and a Memory Owner may configure memory. The platform entities writing to the RM binding register 302 and the MO binding register 304 may be the same or different platform entities. Writing to the RM binding register 302, MO binding register 304, and access permissions register 305 will be described in more detail later. In addition, in an embodiment, a Bus ID of the Resource Manager may be captured from the internal bus (e.g., internal bus 210, FIG. 2), and stored within Bus ID capture register 303. As will be described in detail later, memory hardware module (e.g., memory hardware module 212, FIG. 2) controls whether a particular platform entity is permitted to write to a binding register 302, 304, 305, and captures the Bus ID into Bus ID capture register 303. The binding information within the set of binding registers 302-305 may be used to encrypt or decrypt data, as is described below.

Referring again to FIG. 2, access control block 240 is adapted to manage each data transaction. As will be described in more detail later in conjunction with FIGS. 4 and 5, data transaction management may include determining whether sufficient memory for a data transaction is available within memory block 242. When sufficient memory is available, access control block 240 may allocate a memory partition 254-256 to the data transaction, and may instantiate and maintain a data transaction state machine 250, 251, 252 during the life of the data transaction. Transitions between various states of a data transaction state machine will be described later in conjunction with FIG. 6.

A 1:1 correlation exists between a number of allocated memory partitions 254-256 and a number of current state machines 250-252, in an embodiment. At any given time, M state machines 250-252 and allocated memory partitions 254-256 may exist within memory hardware module 212, where M may be any positive integer number, including 0. In other embodiments, a correlation between the number of allocated memory partitions 254-256, and the number of current state machines 250-252 may be different from 1:1.

Access control block 240 may allow or restrict a platform entity 204-208 from performing various memory-related actions based on various criteria, including a then-current data transaction state, a determination of whether the platform entity 204-208 is within a type of domain that is allowed to perform the memory-related action (e.g., a trusted domain or a non-trusted domain), and a determination of whether the platform entity 204-208 has permission to perform the memory-related action. Access control block 240 may determine whether a platform entity 204-208 is in an appropriate data transaction state by accessing state information from the data transaction state machine 250-251 associated with the data transaction. Further, access control block 240 may determine whether a platform entity 204-208 is within an appropriate domain based on domain configuration information 262 provided to access control block 240. In an embodiment, domain configuration information 262 may be pre-determined and loaded at the factory. Finally, access control block 240 may determine whether a platform entity 204-208 has permission to perform a memory-related action based on access permission information (e.g., information stored within access permissions register 305, FIG. 3). The functioning of access control block 240 will be described in more detail later, in conjunction with FIGS. 4-5.

Cipher/binding function 244 is adapted to encrypt data being transferred from a memory partition 254-256 to a peripheral memory device, and to decrypt data being retrieved from a peripheral memory device. Cipher/binding function 244 performs symmetric encryption/decryption functions, in an embodiment. Data is transferred between cipher/binding function 244 and a peripheral memory device via DMA 214 and peripheral bus 234.

In an embodiment, cipher/binding function 244 uses a unique and secure device identifier value 260 during each encryption or decryption process. Accordingly, all encrypted data is bound with the device identifier value 260, and can only be decrypted using the same device identifier value 260. As long as a device identifier value 260 is unique and inaccessible outside system 200, data encrypted on a particular system 200 should not be decryptable on another system. In an embodiment, cipher/binding function 244 also binds the data using values loaded within the binding registers (e.g., binding registers 302-305, FIG. 3), which provides an additional level of data security.

When data within a memory partition 254-256 is to be stored to a peripheral memory device, a memory partition 254-256 may be allocated for the data transaction. Binding information may be stored within the set of binding registers (e.g., binding registers 302-305, FIG. 3) associated with the allocated memory partition 254-256, and the data to be stored may be loaded within the data block (e.g., data block 308, FIG. 3) associated with the allocated memory partition 254-256. Cipher/binding function 244 encrypts the data using the binding information within the set of binding registers. Cipher/binding function 244 sends the encrypted data to the peripheral memory device via DMA 214.

When encrypted data is to be retrieved from a peripheral memory device (e.g., peripheral devices 104-106, FIG. 1), a memory partition 254-256 may be allocated for the data transaction. Again, binding information may be stored within the set of binding registers (e.g., binding registers 302-305, FIG. 3) associated with the allocated memory partition 254-256. Cipher/binding function 244 receives the encrypted data from DMA 214, and decrypts the encrypted data using the binding information. Cipher/binding function 244 stores the decrypted data into a data block (e.g., data block 308, FIG. 3) of the allocated memory partition 254-256. A platform entity 204-208 having permission to access the data may then retrieve it from the allocated memory partition 254-256.

Binding information used to decrypt data should be the same as the binding information previously used to encrypt the data, in order for cipher/binding function 252 to be able properly to decrypt the data. Embodiments of the inventive subject matter perform certain processes that enable correct binding information to be loaded properly into a set of binding registers for legitimate memory accesses, and that reduce the likelihood that the correct binding information may be loaded into a set of binding registers for illegitimate memory accesses.

In an embodiment, access control block 240 controls whether a platform entity 204-208 is permitted to write information into a binding register. Access control block 240 determines whether or not to permit a platform entity 204-208 to write to a binding register based on the then-current state of the memory partition state machine 250-252, based on the domain to which the platform entity 204-208 belongs, and based on whether the platform entity 204-208 the memory function role to which the platform entity 204-208 is assigned.

As mentioned previously, each platform entity 204-208 is assigned a unique Bus identifier (Bus ID). In addition, each platform entity 204-208 may be assigned to one or more of a plurality of memory function roles, in an embodiment. In an embodiment, each Bus ID may be mapped to a particular memory function role. Accordingly, when memory hardware module 212 reads a particular Bus ID on internal bus 210, memory hardware module 212 may determine to which memory function role the associated platform entity 204-208 is assigned.

Each memory function role specifies what memory-related functions a particular platform entity 204-208 is permitted to perform. When a platform entity 204-208 is assigned to a particular memory function role, the platform entity 204-208 may access memory only in accordance with particular role restrictions associated with that memory function role. In an embodiment, a platform entity 204-208 may be mapped to one or more of at least three memory function roles. These memory function roles include, but are not limited to, a Resource Manager (RM) role, a Memory Owner (MO) role, and a Memory User role. As mentioned previously, a Resource Manager may allocate memory, and a Memory Owner may configure memory. In an embodiment, a Memory User may access memory. Memory User role types may include a domain memory user, an exclusive memory user, and a general memory user. In other embodiments, more, fewer or different memory function roles and/or memory user types may be specified within a system. Platform entities 204-208 assigned to the various memory function roles may be permitted to perform one or more of the functions indicated in Table 1, below, in an embodiment.

TABLE 1

Memory Function Roles

| Memory Function Role | Permitted Memory Functions |
| --- | --- |
| Resource Manager (RM) | Allocate memory partitions 254-256; de-allocate memory partitions 254-256; re-allocate memory partitions 254-256; initiate storage of data to and retrieval of data from peripheral memory devices (e.g., peripheral devices 104-106); and set RM-provided binding information. |
| Memory Owner (MO) | Set user access permissions; unlock memory; set MO-provided binding information; and further restrict (e.g., diminish) memory user access permissions. |
| Memory User (domain memory user) | Access memory when the access permissions information allows restricted and/or general use, but not exclusive use. |
| Memory User (exclusive memory user) | Access memory when the access permissions information allows exclusive and/or general use, but not restricted use. |
| Memory User (general memory user) | Access memory when the access permissions information allows allow general use. |

In an embodiment, memory hardware module 212 is responsible for enforcing role restrictions, and for permitting memory accesses. Memory hardware module 212 determines whether memory accesses will be permitted based on several factors, including whether or not a particular platform entity 204-208 is in a proper domain and/or is assigned to an appropriate role for the type of memory access desired. In addition, memory hardware module 212 determines whether memory accesses will be permitted based on the then-current state of a memory partition state machine 250-252 associated with the data transaction. Transitions through the states of a memory partition state machine 250-252 and the various functions performed by platform entities 204-207 and memory hardware module 212 during a data transaction now will be explained in conjunction with FIGS. 4-6.

Figure 4:
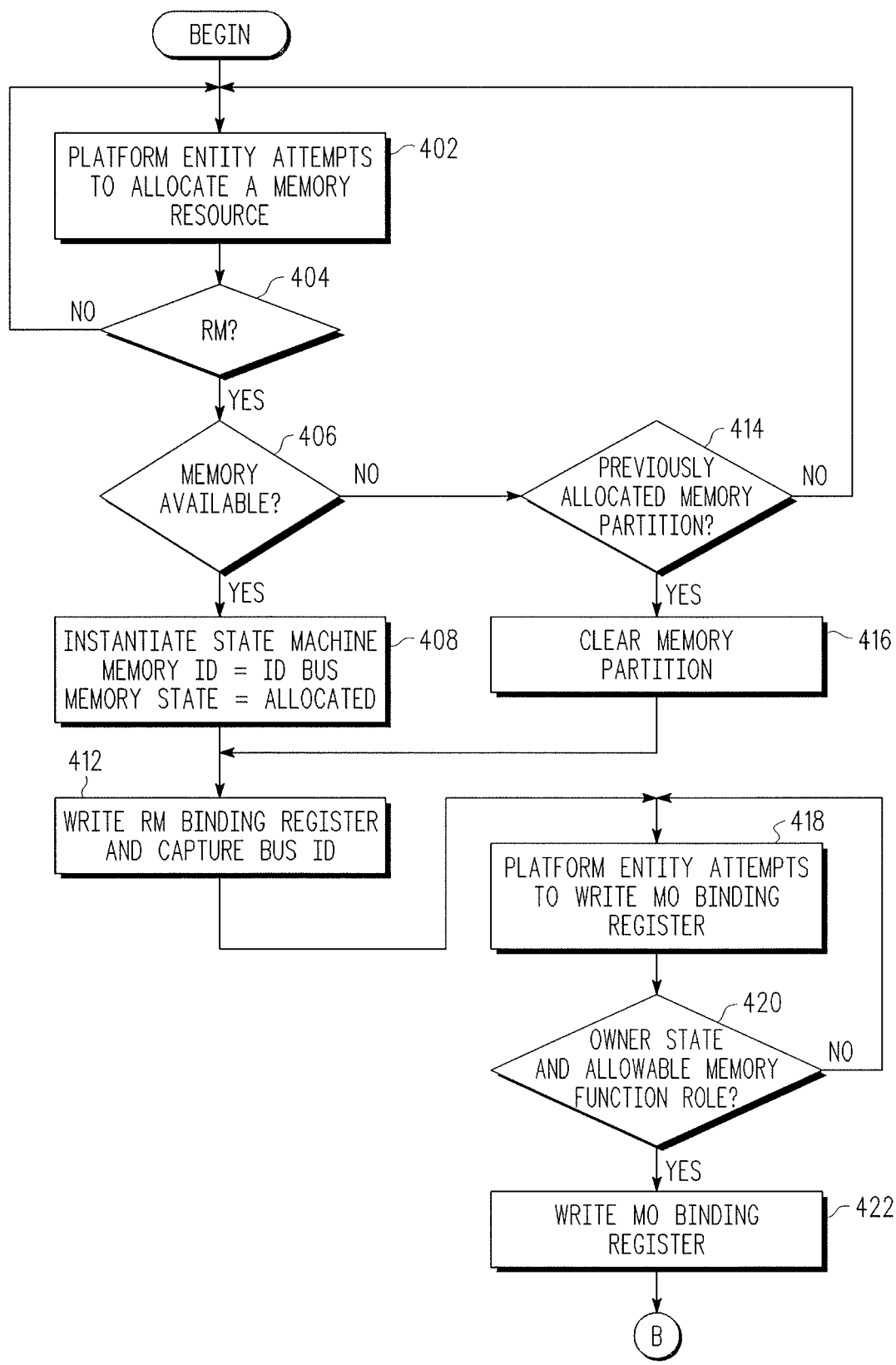
FIGS. 4 and 5 illustrate a flowchart of a method for securely accessing data, in accordance with an example embodiment.
Figure 5:
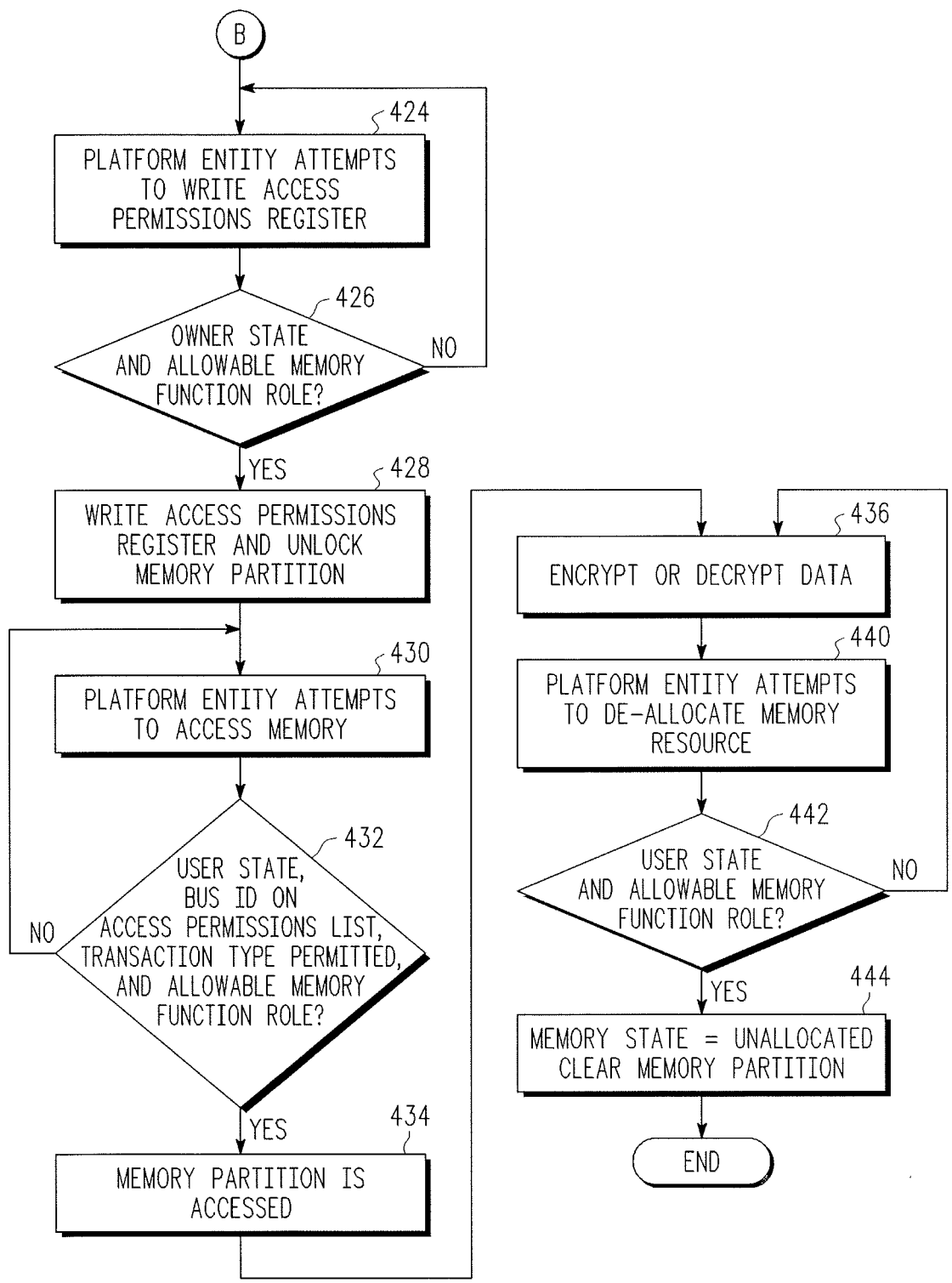

FIGS. 4 and 5 illustrate a flowchart of a method for securely accessing data, in accordance with an example embodiment. Although the description, below, refers to various elements (e.g., an access control block or cipher/binding function) of a memory hardware module performing particular processes, it is to be understood that, in alternate embodiments, other portions of a memory hardware module may perform the indicated processes. In addition, some or all of the indicated processes may be performed outside a memory hardware module.

A data transaction is initiated, in block 402, when a platform entity attempting to act as a Resource Manager (referred to below as a "potential Resource Manager") attempts to allocate a memory resource to the data transaction. In an embodiment, the "memory resource" includes a memory partition (e.g., one of memory partitions 254-256) within a memory hardware module (e.g., memory hardware module 212). In an embodiment, a potential Resource Manager may attempt to allocate a memory resource by issuing an "allocate command," which will attempt to write first binding information to an RM binding register (e.g., RM binding register 302, FIG. 3) of a memory partition.

In an embodiment, the potential Resource Manager places its Bus ID and an allocate command on the control lines of the internal bus (e.g., control lines 232 of internal bus 210). The allocate command may identify the memory partition and the RM binding register to which the potential Resource Manager is attempting to write. The potential Resource Manager also may place the first binding information on the data lines of the internal bus (e.g., data lines 230 of internal bus 210). In an embodiment, the first binding information is a value that is produced by the potential Resource Manager, and may be classified as "RM-provided binding information."

In block 404, the access control block (e.g., access control block 240, FIG. 2) of the memory hardware module reads the Bus ID and allocate command from the internal bus, and determines whether the potential Resource Manager is assigned to a memory function role that allows the potential Resource Manager to perform the memory function of allocating a memory resource (e.g., a memory partition). For example, in an embodiment, a Resource Manager (see Table 1, above) is allowed to perform a memory function of allocating a memory partition. When the potential Resource Manager is not assigned to a memory function role that allows the potential Resource Manager to allocate a memory partition, the attempt to claim a memory resource is disregarded, and the method iterates as shown.

When the access control block determines that the potential Resource Manager is assigned to a memory function role that allows the potential Resource Manager to allocate a memory partition (e.g., the potential Resource Manager is an actual Resource Manager), then in block 406, a further determination is made whether a memory resource is available. In an embodiment, the access control block makes this determination by evaluating whether any memory partition within the memory hardware module's memory block (e.g., memory block 242, FIG. 2) is currently unallocated. In an embodiment, the access control block may make this determination by evaluating the status information for one or more memory partitions to determine if any memory partitions are unallocated.

In an embodiment, the access control block maintains status information, for each memory partition, which indicates whether the memory partition currently is allocated or unallocated. When a memory partition is allocated, the status information further may indicate the identity of the platform entity to which the memory partition is allocated. For example, the status information for a memory partition may include a "Memory Status" variable that may be set to "allocated" or "unallocated," and a "Memory ID" variable that may include the Bus ID of the platform entity to which the memory partition is allocated. In an embodiment, the Memory ID may include a Bus ID of a Resource Manager (see Table 1), when the corresponding memory partition is allocated.

Figure 6:
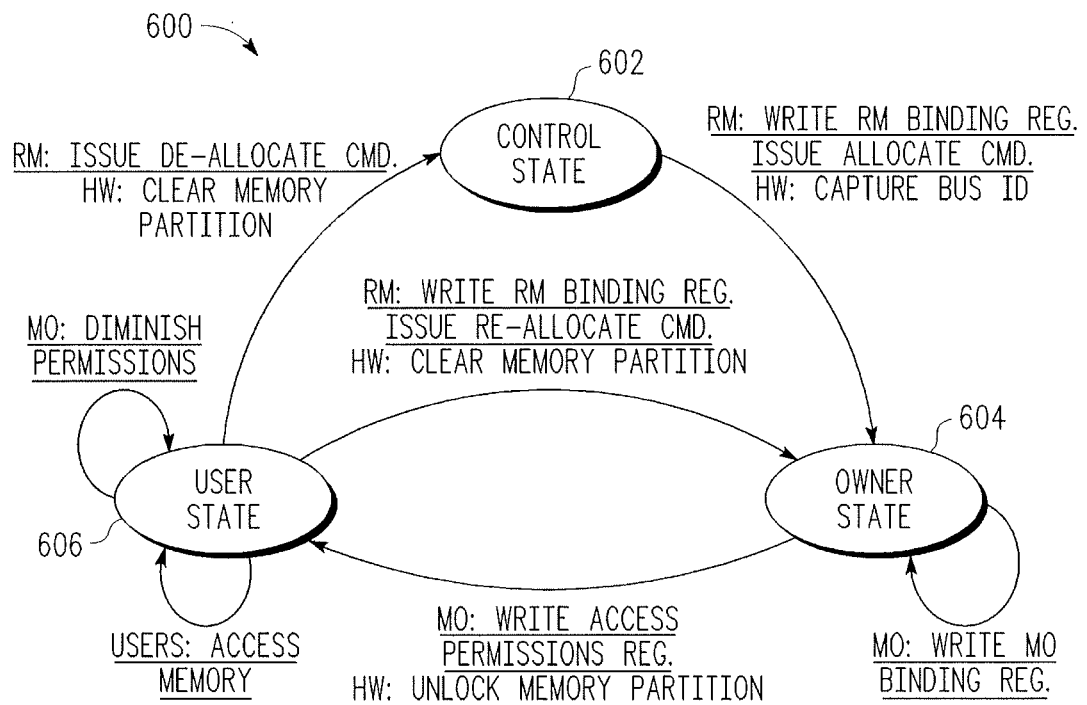
FIG. 6 illustrates a memory partition state machine, in accordance with an example embodiment.

Referring again to block 406, when a memory resource is available (e.g., at least one memory partition is unallocated), the access control block may then instantiate a state machine (e.g., one of state machines 250-252, FIG. 2), in block 408, to maintain information regarding the state of use of the newly-allocated memory partition. The state machine may assist the access control block in determining whether or not a particular platform entity is permitted to perform a particular memory-related action at a particular point in the life of a data transaction. FIG. 6 illustrates a memory partition state machine 600, in accordance with an example embodiment. State machine 600 includes a control state (e.g., control state 602, FIG. 6), an owner state (e.g., owner state 604), and a user state (e.g., user state 606). Throughout the description of FIGS. 4 and 5, below, state machine 600 (FIG. 6) will be referred to in order to illustrate the transitions through the various states. In FIG. 6, actions performed by various elements are indicated along the arrows between states, and in some cases, an arrow will return to the same state. Actions performed by various system elements are indicated along the arrows, where the underlined action indicates the impetus for the transition, and the non-underlined action indicates a result of the underlined action, if any result occurs. In FIG. 6, "HW" refers to memory access hardware (e.g., memory access hardware 212, FIG. 2) and "USERS" refers to users authorized to access data within a memory partition, which users may include one or more of a primary user, domain user, exclusive user, and/or general user.

Referring again to FIG. 4, the access control block may update the status information for the newly-allocated memory partition, also in block 408. For example, in an embodiment, the access control block may update a Memory Status variable to "allocated," and may update a Memory ID variable with the Bus ID of the platform entity. The state machine for the memory partition (e.g., state machine 600, FIG. 6) may then be transitioned to a control state (e.g., control state 602).

In block 412, the access control block may then write the first binding information, which was provided by the Resource Manager, into the RM binding register (e.g., RM binding register 302, FIG. 3) of the newly-allocated memory partition. In addition, in an embodiment, the access control block may then write the Bus ID for the Resource Manager into the Bus ID capture register (e.g., Bus ID capture register 303, FIG. 3) of the allocated memory partition. As the Bus ID is read from the internal bus, it may be considered to be "captured" from the bus. The Bus ID for the Resource Manager may be considered to be second binding information, and also may be classified as RM-provided binding information. Once the first binding information is written into the RM binding register, and the Bus ID of the Resource Manager is written to the Bus ID capture register, the state machine may be transitioned to the owner state (e.g., owner state 604).

Referring again to block 406, when no memory resource is available (e.g., no memory partition is unallocated), the access control block may determine whether a memory partition previously was allocated to the Resource Manager, in block 414. In an embodiment, the access control block makes this determination by comparing the Resource Manager's Bus ID with the Memory ID information for the currently allocated memory partitions. When the Bus ID does not match any Memory ID for any allocated memory partition, then the attempt to re-allocate a memory resource is disregarded, and the method iterates as shown.

When the Bus ID does match a Memory ID for a currently allocated memory partition, then a re-allocation of the memory partition is taking place by the Resource Manager. In an embodiment, in block 416, the access control block may then clear portions of the memory partition (e.g., MO binding register 304, access permissions register 305, and/or data block 308, FIG. 3) by overwriting those portions with zero or other values. Because the memory partition had been previously allocated to the Resource Manager, a state machine (e.g., state machine 600, FIG. 6) should already exist for the memory partition. Generally, re-allocation occurs when the state machine is in a user state (e.g., user state 606). The state machine for the memory partition may then be transitioned to the control state (e.g., control state 602). The method then proceeds to block 412, in which the first binding information is written into the RM binding register of the re-allocated memory partition, as was described above. Once the first binding information is written into the RM binding register, the state machine may be transitioned to the owner state (e.g., owner state 604).

In block 418, the same or another platform entity attempting to act as a Memory Owner memory function role (referred to below as a "first potential Memory Owner") may attempt to write third binding information into an MO binding register (e.g., MO binding register 304, FIG. 3) of the allocated memory partition. In an embodiment, the first potential Memory Owner places its Bus ID and a write request on the control lines of the internal bus (e.g., control lines 232 of internal bus 210). The write request may identify the memory partition and the MO binding register to which the first potential Memory Owner is attempting to write. The first potential Memory Owner also may place the third binding information on the data lines of the internal bus (e.g., data lines 230 of internal bus 210). In an embodiment, the third binding information is a value that is produced by the first potential Memory Owner.

In block 420, the access control block reads the Bus ID and write request from the internal bus, and determines whether the state machine is in the owner state (e.g., owner state 604, FIG. 6), and whether the first potential Memory Owner is assigned to a memory function role that allows the first potential Memory Owner to perform the memory function of writing to an MO binding register. For example, in an embodiment, a Memory Owner (see Table 1, above) is allowed to perform a memory function of writing to an MO binding register. When the state machine is not in the owner state, or when the first potential Memory Owner is not assigned to a memory function role that allows the first potential Memory Owner to write to an MO binding register, the attempt to write to the MO binding register is disregarded, and the method iterates as shown.

When the access control block determines that the state machine is in the owner state, and that the potential Memory Owner is assigned to a memory function role that allows the potential Memory Owner to write to an MO binding register (e.g., the potential Memory Owner is actually assigned to be a Memory Owner), then in block 422, the access control block may then write the third binding information, which was provided by the Memory Owner, into the MO binding register (e.g., MO binding register 304, FIG. 3) of the allocated memory partition. The third binding information may be classified as "MO-provided binding information."

Transitioning now from block 422 of FIG. 4 to block 424 of FIG. 5, the same or another platform entity (referred to below as a "second potential Memory Owner") may attempt to write access permission information into an access permissions register (e.g., access permissions register 305, FIG. 3) of the allocated memory partition. In an embodiment, the second potential Memory Owner places its Bus ID and a write request on the control lines of the internal bus (e.g., control lines 232 of internal bus 210). The write request may identify the memory partition and the access permissions register to which the second potential Memory Owner is attempting to write. The second potential Memory Owner also may place the fourth binding information on the data lines of the internal bus (e.g., data lines 230 of internal bus 210).

In an embodiment, the fourth binding information includes access permissions information (e.g., an access permissions list), which may identify (e.g., by Bus ID) any platform entities that may access the data within the memory partition. The Resource Manager, the Memory Owner, and the second potential Memory Owner may or may not be included within the access permissions information. In addition to the identities of platform entities that may access the data within the memory partition, the access permissions information may indicate what types of memory accesses (e.g., read, write, and/or execute) each of the identified platform entities may perform. As used herein, the term "access" means read, write, and/or execute. The access permissions information also may indicate whether access is restricted, general, or exclusive. Exclusive access may indicate that only a specifically-identified platform entity may access the memory. Restricted access may indicate that only platform entities within a particular domain may access the memory. General access may indicate that platform entities within multiple domains, or all platform entities, may access the memory.

In block 426, the access control block reads the Bus ID and write request from the internal bus, and determines whether the state machine is in the owner state (e.g., owner state 604, FIG. 6), and whether the second potential Memory Owner is assigned to a memory function role, which allows the second potential Memory Owner to perform the memory function of writing to an access permissions register. For example, in an embodiment, a Memory Owner (see Table 1, above) is allowed to perform a memory function of writing to an access permissions register. When either the state machine is not in the owner state or the second potential Memory Owner is not assigned to a memory function role that allows the second potential Memory Owner to write to an access permissions register, the attempt to write to the access permissions register is disregarded, and the method iterates as shown.

When the access control block determines that the state machine is in the owner state, and the second potential Memory Owner is assigned to a memory function role that allows the second potential Memory Owner to write to an access permissions register (e.g., the second potential Memory Owner is actually assigned to be a Memory Owner), then in block 428, the access control block may write the access permissions information, which was provided by the Memory Owner, into the access permissions register (e.g., access permissions register 305, FIG. 3) of the allocated memory partition. The access permissions information may be considered to be fourth binding information, and may be classified as MO-provided binding information. Once the access permissions information is written into the access permissions register, the data block (e.g., data block 308, FIG. 3) for the memory partition is considered to be unlocked to those platform entities identified within the access permissions information. The state machine for the memory partition may then be transitioned to the user state (e.g., user state 606, FIG. 6).

In block 430, the same or another platform entity attempting to act as a Memory User (referred to below as a "potential Memory User") may attempt to access the memory block (e.g., memory block 308, FIG. 3) of the allocated memory partition. In an embodiment, the potential Memory User places its Bus ID and an access request on the control lines of the internal bus (e.g., control lines 232 of internal bus 210). The access request may indicate the access type (e.g., read, write, and/or execute), and may identify the memory partition and the data block that the potential Memory User is attempting to access. For a write type of access, the potential Memory User also may place the data to be written on the data lines of the internal bus (e.g., data lines 230 of internal bus 210).

In block 432, the access control block reads the Bus ID and access request from the internal bus, and determines whether the state machine is in the user state (e.g., user state 606, FIG. 6), and whether the potential Memory User has permission to access the memory in the requested manner. In an embodiment, this includes the access control block determining whether the potential Memory User's Bus ID is included within the access permissions list in the access permissions register, and also whether the requested type of access (e.g., read, write, and/or execute) is permitted for the potential Memory User. In addition, the access control block may determine whether the potential Memory User is assigned to a memory function role that allows the potential Memory User to perform the memory function of accessing the memory as requested. For example, in an embodiment, a domain-type Memory User, an exclusive-type Memory User, and a general-type Memory User (see Table 1, above) may be allowed to perform a memory function of accessing a data block. In an embodiment, a domain-type Memory User may be allowed access when the access permissions information allows restricted and/or general use, but not exclusive use. An exclusive-type Memory User may be allowed access when the access permissions information allows exclusive and/or general use, but not restricted use. Finally, a general-type Memory User may be allowed access when the access permissions information allows general use. When either the potential Memory User is not identified in the access permissions information, the requested type of access is not permitted, or the potential Memory User is not assigned to a memory function role that allows the potential Memory User to access the memory, the attempt to access the data block is disregarded, and the method iterates as shown.

When the access control block determines that the state machine is in the user state, the potential Memory User is identified in the access permissions information, the potential Memory User has permission to access the memory in the desired manner (e.g., read, write, and/or execute), and the potential Memory User is assigned to a memory function role that allows the potential Memory User to access the memory (e.g., the potential Memory User is actually assigned to be a domain-type Memory User, an exclusive-type Memory User, or a general-type Memory User (see Table 1)), then in block 434, the access control block may then perform the requested memory access by writing data to the memory block (e.g., memory block 308, FIG. 3), reading data from the memory block, or facilitating execution of code within the memory block.

In the context of the memory access, data may be encrypted or decrypted and exchanged with a peripheral memory device, in block 436. Encryption, decryption, and data exchange may occur before, after or concurrently with block 434. For a write type of memory access request, once the platform entity has provided the data within the data block (e.g., data block 308, FIG. 3), the cipher/binding function (e.g., cipher/binding function 244, FIG. 2) of the memory hardware module may encrypt the data using some or all of the binding information within some or all of the binding registers (e.g., binding registers 302-305, FIG. 3), in an embodiment. As mentioned previously, the cipher/binding function also may use the device identifier (e.g., device identifier 260, FIG. 2) during the encryption process. The encrypted data may then be stored to a peripheral memory device (e.g., peripheral memory device 104-106, FIG. 1) via a DMA (e.g., DMA 214, FIG. 2). For a read type of memory access request, the memory hardware module may, via a DMA, fetch the encrypted version of the requested data from a peripheral memory device. The cipher/binding function may then decrypt the encrypted data using some or all of the binding information within some or all of the binding registers. In addition, the device identifier may be used to decrypt the encrypted data. The decrypted data is placed within the memory block (e.g., memory block 308, FIG. 3) of the appropriate memory partition.

While in the user state, a potential Memory Owner may attempt to further restrict or diminish permissions specified within the access permissions register (e.g., access permissions register 305, FIG. 3), in an embodiment. In another embodiment, a Resource Manager, rather than a Memory Owner, may perform the function of further restricting or diminishing permissions. An ability to diminish access permissions may provide an advantage of enabling data initially to be accessible to a first set of platform entities (e.g., upon download from an external source), and then later to be accessible to a more limited set of platform entities. For example, when a decryption key initially is downloaded from an external source such as a digital rights management entity, it may be placed in a cache or other unsecured area, and it may be desirable for a Memory Owner to have access to the decryption key to initiate a process of encrypting the key for secure storage in a peripheral memory device (e.g., one of peripheral devices 104-106, FIG. 6). However, once the initial access is completed, it may be desirable to exclude the Memory Owner from access to the decryption key. Accordingly, in an embodiment, initial access permissions may be diminished to exclude one or more platform entities that previously had access to certain data, and/or to diminish the types of access that one or more platform entities are permitted to perform.

In an embodiment, a potential Memory Owner may attempt to diminish permissions by attempting to write access permission information into the access permissions register (e.g., access permissions register 305, FIG. 3), as described previously in conjunction with block 424. In response, the access control block may determine whether the attempt to write the access permissions information is permitted, as described previously in conjunction with block 426. When the access control block determines that the attempt is permitted, the access control block may write the access permissions information, as described previously in conjunction with block 428. The state machine for the memory partition may remain in the user state (e.g., user state 606, FIG. 6).

In addition, while in the user state, a potential Resource Manager may attempt to re-allocate a memory partition, as discussed previously in conjunction with blocks 414 and 416. In an embodiment, a potential Resource Manager may attempt to re-allocate a memory partition by issuing a re-allocate command, which will initiate an attempt to re-write the RM binding register.

In an embodiment, the potential Resource Manager places its Bus ID and a re-allocate command on the control lines of the internal bus (e.g., control lines 232 of internal bus 210). The re-allocate command may identify the memory partition and the RM binding register to which the potential Resource Manager is attempting to write. The potential Resource Manager also may place new, first binding information on the data lines of the internal bus (e.g., data lines 230 of internal bus 210). The access control block (e.g., access control block 240, FIG. 2) reads the Bus ID and re-allocate command from the internal bus, and determines whether the potential Resource Manager is assigned to a memory function role that allows the potential Resource Manager to perform the memory function of re-allocating a memory resource (e.g., a memory partition). When the potential Resource Manager is not assigned to a memory function role that allows the potential Resource Manager to re-allocate a memory partition, the attempt to re-allocate the memory resource is disregarded. When the potential Resource Manager is assigned to a memory function role that allows the potential Resource Manager to re-allocate a memory partition, In block 412, the access control block may then write the new, first binding information, which was provided by the Resource Manager, into the RM binding register (e.g., RM binding register 302, FIG. 3) of the re-allocated memory partition. In addition, the access control block may clear a remainder of the memory partition (e.g., MO binding register 304, access permissions register 305, and/or data block 308) by overwriting those portions with zero or other values. The state machine for the memory partition (e.g., state machine 600, FIG. 6) may then be transitioned back to the owner state (e.g., owner state 604), and the method may return to block 418.

In addition, while in the user state, a potential Resource Manager may attempt to de-allocate the memory resource, in block 440. In an embodiment, a potential Resource Manager may attempt to de-allocate a memory resource by placing its Bus ID and a de-allocate command on the control lines of the internal bus (e.g., control lines 232 of internal bus 210). The de-allocate command may identify the memory partition that the potential Resource Manager is attempting to de-allocate.

In block 442, the access control block reads the Bus ID and de-allocate command from the internal bus, and determines whether the state machine is in the user state (e.g., user state 606, FIG. 6), and whether the potential Resource Manager is assigned to a memory function role that allows the potential Resource Manager to perform the memory function of de-allocating a memory resource (e.g., a memory partition). For example, in an embodiment, a Resource Manager (see Table 1, above) is allowed to perform a memory function of de-allocating a memory partition. When the state machine is not in the user state, or when the potential Resource Manager is not assigned to a memory function role that allows the potential Resource Manager to de-allocate a memory partition, the attempt to de-allocate the memory resource is disregarded, and the method iterates as shown.

When the access control block determines that the state machine is in the user state, and the potential Resource Manager is assigned to a memory function role that allows the potential Resource Manager to de-allocate a memory partition, the access control block may de-allocate the memory partition. De-allocation may include updating the status information for the memory partition, in block 444. For example, in an embodiment, the access control block may update a Memory Status variable to "unallocated," and may clear a Memory ID variable. In addition, in an embodiment, the access control block may clear (e.g., overwrite with zeros or other values) the memory partition, including clearing some or all of the binding registers (e.g., binding registers 302-305, FIG. 3) and/or any data within the data block (e.g., data block 308) of the memory partition. In addition, the state machine for the memory partition may be transitioned back to the control state (e.g., state 602, FIG. 6) or discontinued (e.g., deleted or abandoned). The method may then end.

Embodiments described above discuss various data access methods and apparatus. Embodiments of the inventive subject matter may be used in a wide variety of secure data access applications, as would be apparent to one of skill in the art based on the description herein. Embodiments may be particularly useful to protect sensitive data from unauthorized access. Examples of sensitive data include, but are not limited to, system configuration data, encryption keys, audio/video/multi-media content, credit card information, social security numbers, other personal information, and software programs, to name a few. For example, an embodiment may be implemented on a portable electronics device, such as a cellular telephone, in order to protect configuration information for the device. Protecting the configuration information using various embodiments may prevent third parties from altering the configuration information to increase or decrease device functionality, for example. In addition to configuration information, it may be desirable to protect device identity information, in order to prevent another device from assuming the device identity to use services without authorization. As another example, an embodiment may be implemented on a portable media display device (e.g., an audio or video player), in order to protect content (e.g., songs, videos) and/or content decryption keys.

Thus, various embodiments of systems, apparatus and methods for securely accessing data have been described. Embodiments of the inventive subject matter may provide one or more technical or economic advantages, including but not limited to better protecting sensitive data from unauthorized access. An embodiment includes a method for securely accessing data in the context of a data transaction. The method is performed in a system that includes multiple platform entities. The method includes writing data, by a first platform entity, into a data block of a memory partition allocated to the data transaction. The method also includes encrypting the data using binding information to produce encrypted data, where the binding information is provided by a set of the multiple platform entities that are permitted to participate in the data transaction.

In another embodiment, a method for securely accessing data in the context of a data transaction includes allocating a memory partition to the data transaction, and a first platform entity writing access permissions information into at least one binding register associated with the memory partition. The method also includes permitting a second platform entity to access data stored in a data block of the memory partition when the second platform entity is identified in the access permissions information, where the first platform entity and the second platform entity may be a same platform entity or different platform entities. The method also includes the second platform entity accessing the data.

Another embodiment includes a system for securely accessing data in the context of a data transaction. The system includes a memory block, within which a memory partition may be allocated to the data transaction, where the memory partition includes a data storage block and at least one binding register. The data block is adapted to store data, and the at least one binding register is adapted to store binding information, which includes information provided by a set of platform entities that are permitted to participate in the data transaction. The system also includes the set of platform entities, where each of the set of platform entities includes one or more hardware blocks adapted to perform one or more functions. The system also includes an access control block, adapted to determine whether a particular platform entity is permitted to access the data and whether the particular platform entity is permitted to write a portion of the binding information. The system also includes a cipher/binding function adapted to encrypt the data, using the binding information, for storage on an unsecured memory device, and to decrypt encrypted data, using the binding information, which is retrieved from the unsecured memory device.

Another embodiment also includes a system for securely accessing data in the context of a data transaction. The system includes a memory block, within which a memory partition may be allocated to the data transaction. The memory partition includes a data storage block and at least one binding register, where the data block is adapted to store data, and the at least one binding register is adapted to store access permissions information. The system also includes the set of platform entities, where each of the set of platform entities includes one or more hardware blocks adapted to perform one or more functions. The system also includes an access control block, adapted to determine whether a particular platform entity is permitted to access the data based at least in part on the access permissions information. The system also includes a cipher/binding function adapted to encrypt the data, using at least the access permissions information, for storage on an unsecured memory device, and to decrypt encrypted data, using at least the access permissions information, which is retrieved from the unsecured memory device.

While the principles of the inventive subject matter have been described above in connection with specific systems, apparatus, and methods, it is to be clearly understood that this description is made only by way of example and not as a limitation on the scope of the inventive subject matter. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A method for securely accessing data in the context of a data transaction, the method being performed in a multi-processor platform that includes multiple platform entities and a memory block, and comprising the steps of:
   a module of the multi-processor platform initiating the data transaction by allocating a memory partition within the memory block to the data transaction, wherein the memory partition includes a plurality of binding registers and a data block;
   receiving, from each platform entity in a set of the multiple platform entities, a write request and binding information for each of the plurality of binding registers;
   determining, by the module of the multi-processor platform, whether each platform entity in the set of the multiple platform entities is permitted to participate in the data transaction;
   when each platform entity in the set of the multiple platform entities is allowed to participate in the data transaction, storing the binding information received from each platform entity in the set of the multiple platform entities into the plurality of binding registers;
   writing data, by a first platform entity of the set of the multiple platform entities, into the data block of the memory partition within the memory block;
   writing a Bus ID of a second platform entity into a first binding register of the plurality of binding registers, wherein the Bus ID forms at least a portion of the binding information from the second platform entity, and wherein the first platform entity and the second platform entity include either a same platform entity or different platform entities;
   encrypting the data using the binding information in each of the plurality of binding registers to produce encrypted data; and
   storing the encrypted data on a peripheral memory device.

2. The method of claim 1, wherein
   receiving the write request and the binding information comprises a second platform entity attempting to write of the binding information into at least one binding register of the plurality of binding registers, wherein the first platform entity and the second platform entity include either a same platform entity or different platform entities; and
   determining whether each platform entity is permitted to participate in the data transaction comprises determining that the second platform entity is permitted to write the binding information when the second platform entity is assigned to a memory function role that allows writing to the binding register, wherein a platform entity is assigned to one or more of a plurality of memory function roles.

3. The method of claim 1, further comprising the steps of:
   determining whether the second platform entity is a Resource Manager; and
   when the second platform entity is the Resource Manager, permitting the second platform entity to write a second binding value into a memory controller binding register of the plurality of binding registers.

4. The method of claim 1, further comprising the steps of:
   determining whether a second platform entity is a Memory Owner; and
   when the second platform entity is the Memory Owner, permitting the second platform entity to write a second binding value into a memory owner binding register of the plurality of binding registers, wherein the second binding value is the binding information from the second platform entity, and wherein the first platform entity and the second platform entity include either a same platform entity or different platform entities.

5. The method of claim 1, further comprising the steps of:
   determining whether a second platform entity is a Memory Owner; and
   when the second platform entity is the Memory Owner, permitting the second platform entity to write access permissions information into an access permissions binding register of the plurality of binding registers, wherein the access permissions information is the binding information from the second platform entity, and wherein the first platform entity and the second platform entity include either a same platform entity or different platform entities.

6. The method of claim 5, further comprising:
determining whether the first platform entity is identified in the access permissions information as having permission to write the data; and
when the first platform entity is identified in the access permissions information as having permission to write the data, permitting the first platform entity to write the data.

7. The method of claim 1, further comprising the steps of:
initiating a state machine for the data transaction, wherein the state machine includes a user state; and
permitting the first platform entity to write the data when the state machine is in the user state.

8. The method of claim 7, wherein the state machine further includes a control state, and the method further comprises the step of:
a second platform entity attempting to write Resource Manager-provided binding information into a Resource Manager binding register of the plurality of binding registers, wherein the first platform entity and the second platform entity include either a same platform entity or different platform entities; and
permitting the second platform entity to write the Resource Manager-provided binding information when the state machine is in the control state.

9. The method of claim 7, wherein the state machine further includes an owner state, and the method further comprises the step of:
a second platform entity attempting to write Memory Owner-provided binding information into a Memory Owner binding register of the plurality of binding registers, wherein the first platform entity and the second platform entity include either a same platform entity or different platform entities; and
permitting the second platform entity to write the Memory Owner-provided binding information when the state machine is in the owner state.

10. The method of claim 1, wherein encrypting comprises:
also encrypting the data using a device identifier.

11. A method for securely accessing data in the context of a data transaction, the method being performed in a multi-processor platform that includes multiple platform entities and a memory block, and comprising the steps of:
a module of the multi-processor platform initiating the data transaction by allocating a memory partition of the memory block to the data transaction, wherein the memory partition includes at least one binding register and a data block;
receiving, from a first platform entity in a set of the multiple platform entities and after the memory partition has been allocated, access permissions information and a write request identifying a first binding register of the at least one binding register;
determining, by the module of the multi-processor platform, whether the first platform entity is permitted to participate in the data transaction;
when the first platform entity of the set of the multiple platform entities is permitted to participate in the data transaction, writing the access permissions information into the first binding register, wherein the access permissions information forms at least a portion of binding information for encrypting data within the data block of the memory partition or for decrypting encrypted data to produce data to be stored in the data block of the memory partition, wherein the data includes data being transferred between a second platform entity and a peripheral memory device, writing a Bus ID of the second platform entity into a first binding register of the plurality of binding registers, wherein the Bus ID forms at least a portion of the binding information from the second platform entity, and wherein the first platform entity and the second platform entity include either a same platform entity or different platform entities;
receiving, from the second platform entity, an access request identifying the data block and indicating a requested type of access;
when the access permissions indicate that the second platform entity is permitted to perform the requested type of access, encrypting or decrypting data in the data block of the memory partition using the binding information in the at least one binding register, which includes the access permissions; and
allowing the second platform entity to access the data.

12. The method of claim 11, wherein encrypting or decrypting and allowing the second platform entity to access the data comprises:
for a write type of access request, encrypting the data using the binding information to produce encrypted data; and
storing the encrypted data to an unsecured memory device.

13. The method of claim 11, wherein encrypting or decrypting and allowing the second platform entity to access the data comprises:
for a read type of access request, retrieving encrypted data from an unsecured memory device; and
decrypting the encrypted data using the binding information to produce the data.

14. The method of claim 11, further comprising the steps of:
a third platform entity attempting to write Resource Manager-provided binding information into a second register of the at least one binding register, wherein some or all of the first platform entity, the second platform entity, and the third platform entity include either a same platform entity or different platform entities; and
permitting the third platform entity to write the Resource Manager-provided binding information when the third platform entity is a Resource Manager.

15. The method of claim 11, further comprising the steps of:
a third platform entity attempting to write Memory Owner-provided binding information into a second register of the at least one binding register, wherein some or all of the first platform entity, the second platform entity, and the third platform entity include either same platform entities or different platform entities; and
permitting the third platform entity to write the Memory Owner-provided binding information when the third platform entity is a Memory Owner.

16. The method of claim 11, further comprising the steps of:
providing additional binding information in the at least one binding register, wherein the additional binding information is provided by a set of the multiple platform entities that are permitted to participate in the data transaction.

17. A multi-processor platform for securely accessing data in the context of a data transaction, the platform comprising:
a memory block, within which a memory partition is allocated to the data transaction, wherein the memory partition includes a data storage block and at least one binding register, and wherein the data storage block is adapted to store data being transferred between a platform entity and an unsecured memory device, and wherein the at least one binding register is adapted to store binding information, wherein the binding information includes information provided by a set of platform entities that are permitted to participate in the data transaction, and the binding information includes information that at least partially identifies the set of the multiple platform entities that are permitted to participate in the data transaction;

the set of platform entities, wherein each of the set of platform entities includes one or more hardware blocks adapted to perform one or more functions;

an access control block, adapted to initiate the data transaction by allocating the memory partition within the memory block to the data transaction, to receive, from each platform entity in the set of platform entities, a write request and binding information for each of the at least one binding register, to determine whether each platform entity in the set of platform entities is permitted to participate in the data transaction, including determining whether a particular platform entity of the set of platform entities is permitted to access the data and whether the particular platform entity is permitted to write a portion of the binding information, and, when each platform entity is allowed to participate in the data transaction, to allow the binding information received from each platform entity to be stored into the at least one binding register;

writing a Bus ID of a second platform entity into a first binding register of the plurality of binding registers, wherein the Bus ID forms at least a portion of the binding information from the second platform entity, and wherein the particular platform entity and the second platform entity include either a same platform entity or different platform entities;

and cipher/binding function adapted, in the context of the data transaction, to encrypt the data, using the binding information in each binding register of the at least one binding register, for storage on the unsecured memory device, and to decrypt encrypted data, using the binding information, which is retrieved from the unsecured memory device.

18. The platform of claim 17, wherein the memory block, the set of platform entities, the access control block, and the cipher/binding function are included within a system-on-a-chip.

19. The platform of claim 17, wherein the memory block, the set of platform entities, the access control block, and the cipher/binding function are included within a system-in-package.

20. The platform of claim 17, wherein the apparatus is selected from a group of apparatus that includes a cellular telephone, a pager, a radio, a personal data assistant, a portable media player, a computer, a controller, a set top box, and a gaming system.

21. A multi-processor platform for securely accessing data in the context of a data transaction, the platform comprising:

a memory block, which includes a memory partition that can be allocated to the data transaction, wherein the memory partition includes a data storage block and at least one binding register, and wherein the data storage block is adapted to store data being transferred between a platform entity of a set of platform entities of the multi-processor platform and an unsecured memory device, and wherein the at least one binding register is adapted to store access permissions information;

the set of platform entities, wherein each of the set of platform entities includes one or more hardware blocks adapted to perform one or more functions;

an access control block, adapted to initiate the data transaction by allocating the memory partition within the memory block to the data transaction, to receive, from a first platform entity in the set of platform entities, a write request and access permissions information, to store the access permissions information in the at least one binding register when a determination is made that the first platform entity is permitted to participate in the data transaction, and to determine whether a second platform entity of the set of platform entities is permitted to access the data based at least in part on the access permissions information;

writing a Bus ID of a second platform entity into a first binding register of the plurality of binding registers, wherein the Bus ID forms at least a portion of the binding information from the second platform entity, and wherein the first platform entity and the second platform entity include either a same platform entity or different platform entities; and a cipher/binding function adapted, in the context of the data transaction and when the second platform entity is permitted to access the data, to encrypt the data, using at least the access permissions information in the at least one binding register, for storage on the unsecured memory device, and to decrypt encrypted data, using at least the access permissions information, which is retrieved from the unsecured memory device.

* * * * *

UNITED STATES PATENT AND TRADEMARK OFFICE
CERTIFICATE OF CORRECTION

PATENT NO. : 8,464,069 B2  Page 1 of 1
APPLICATION NO. : 11/671271
DATED : June 11, 2013
INVENTOR(S) : Lawrence W. Case and Thomas Tkacik It is certified that error appears in the above-identified patent and that said Letters Patent is hereby corrected as shown below:

In the Claims

Column 18, Line 28: "to write of the binding" should be --to write the binding--

Signed and Sealed this
Eleventh Day of March, 2014

Michelle K. Lee
*Deputy Director of the United States Patent and Trademark Office*